Figure 1:
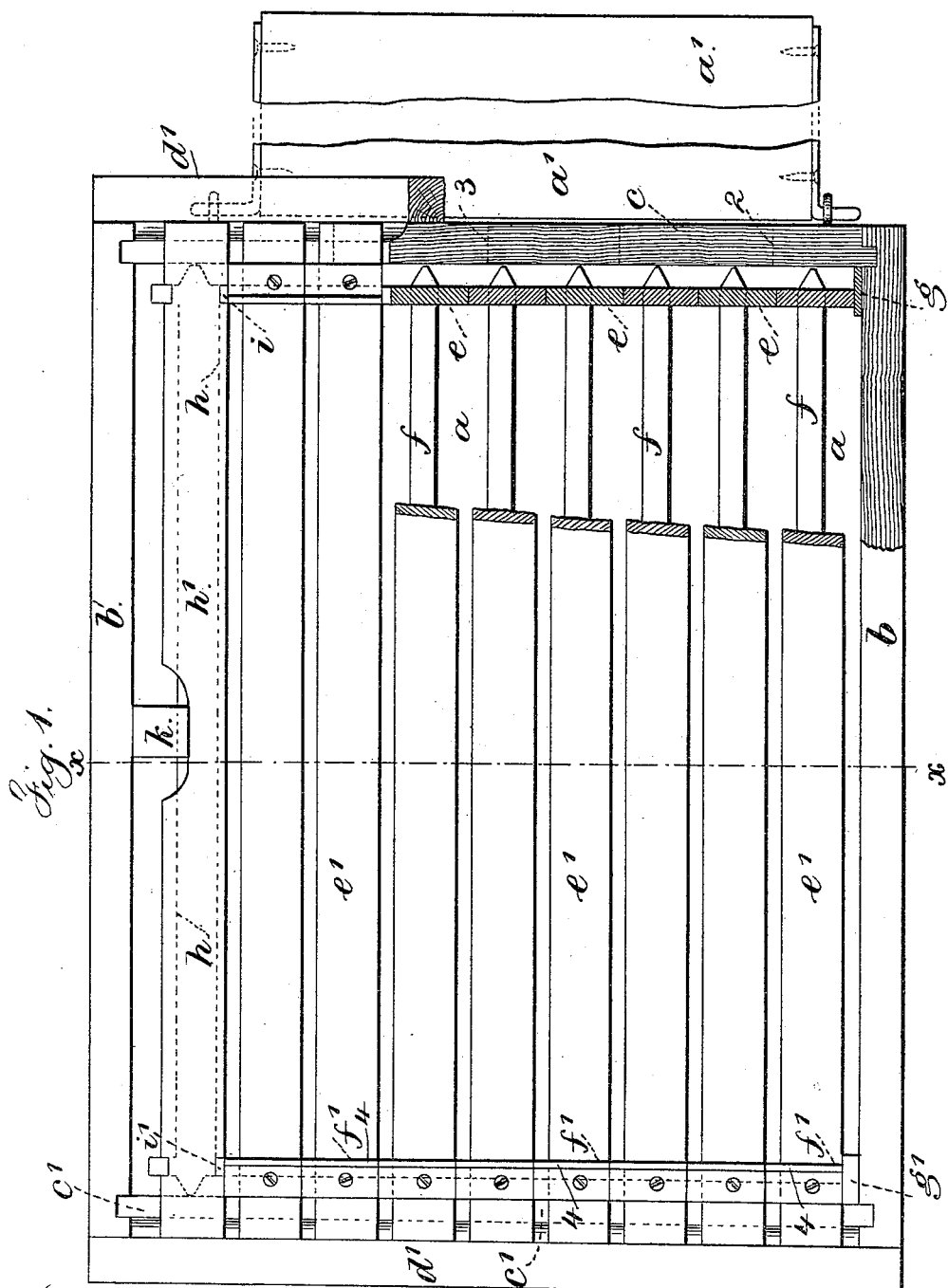

(No Model.) 2 Sheets—Sheet 1.

L. A. ASPINWALL.
BEEHIVE.

No. 493,466. Patented Mar. 14, 1893.

Witnesses
Chas. H. Smith
J. Staib

Inventor
L. A. Aspinwall
per Lemuel W. Serrell
Atty

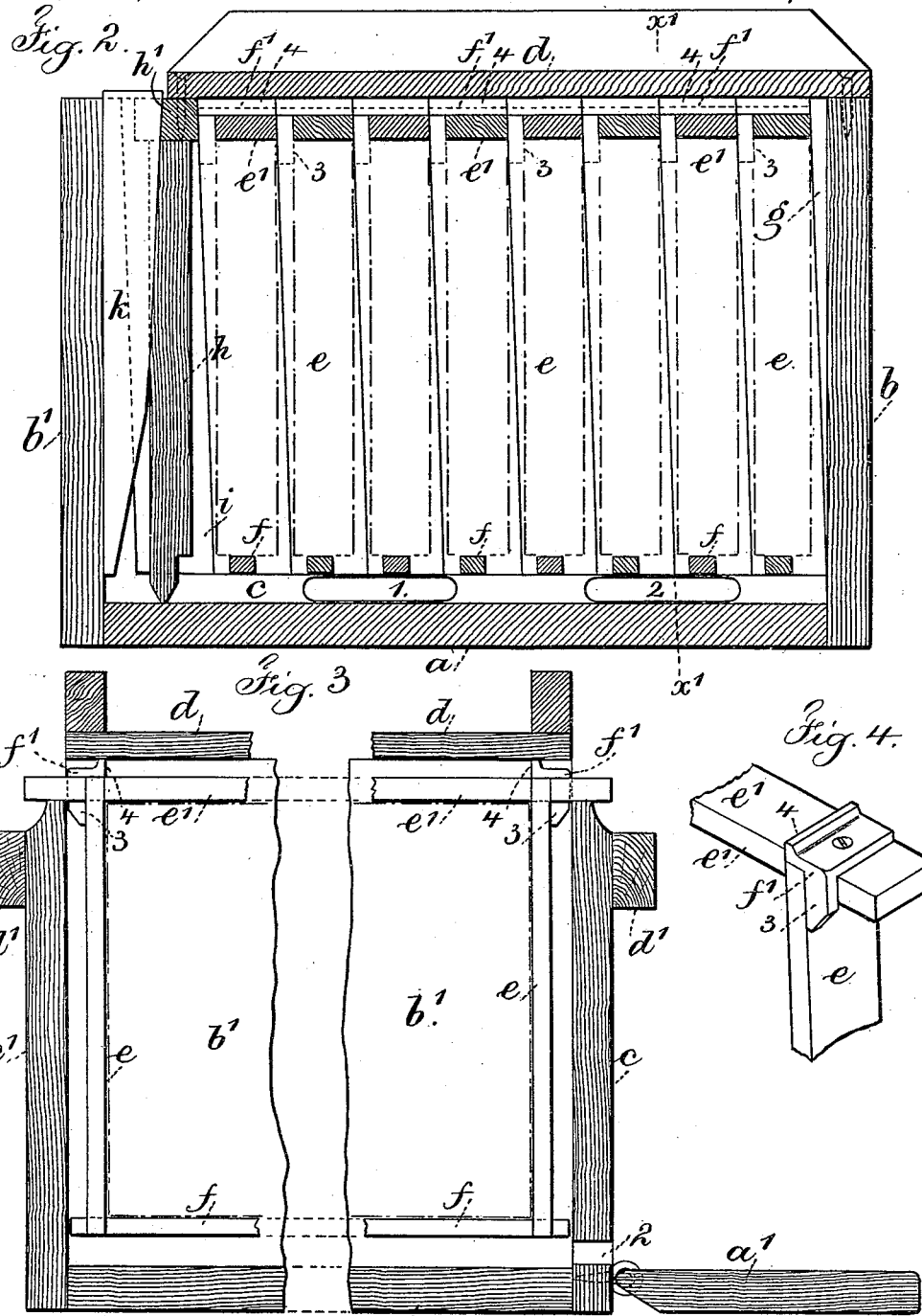

UNITED STATES PATENT OFFICE.

LEWIS AUGS. ASPINWALL, OF JACKSON, MICHIGAN, ASSIGNOR TO THE ASPINWALL MANUFACTURING COMPANY, OF SAME PLACE.

BEEHIVE.

SPECIFICATION forming part of Letters Patent No. 493,466, dated March 14, 1893.

Application filed September 30, 1892. Serial No. 447,364. (No model.)

*To all whom it may concern:*

Be it known that I, LEWIS AUGUSTUS ASPINWALL, a citizen of the United States, residing at Jackson, in the county of Jackson and State of Michigan, have invented a new and useful Improvement in Beehives, of which the following is a specification.

In bee hives as heretofore constructed with movable frames, said frames have been made with closed end pieces that were vertical and the combs built therein because of their surface inequalities would frequently come close together. In removing or replacing these frames the bees would be crushed unless these frames were operated by a lateral movement. In this latter case however the bees were liable to be crushed between the end pieces. These movable frames were also supported within the hives, and in taking hold of said frames it was necessary to put the fingers in among the bees.

The object of my invention is to overcome these difficulties.

This invention is especially intended for the hives used for breeding purposes and in which are contained the combs for wintering the bees upon. I makes use of frames for the combs, the end pieces of which frames come close together in order that there may be confined air spaces between the end pieces of the frame and the ends of the hive, but these end pieces of the frame instead of being perpendicular are at an inclination, so that when the frames are drawn out or moved into place the inclined end pieces of the frame will cause the vertical combs within such frames to separate or be sufficiently distant from each other to prevent injury to the bees themselves while the frames are being either drawn out or placed together, and the top bars of the frames extend above and beyond the top edges of the end pieces of the hive, so that they are easily grasped in lifting out the frames and the fingers are not in proximity to the base, and upon the frames are upward projections, preferably of metal, upon which the top board of the hive rests, so that there is a space between the frames and the top board, and the sides of the hive extend above the ends of the hive so that the top edges of the sides of the hive are at the same level as the projections upon the frames for the top board of the hive to rest down closely upon the respective parts for the retention of the proper warmth, and the respective parts of the hive are held firmly and closely together to obtain the necessary solidity in shipment, and the greatest facility is given in the manipulation of the parts of the hive.

In the drawings, Figure 1 is a plan partially in section of my improved bee hive with the cover removed. Fig. 2 is a cross section at $x\ x$ of Fig. 1. Fig. 3 is a longitudinal section at $x'\ x'$ of Fig. 2 with the inner portion removed, and Fig. 4 is a perspective view of one corner of one removable frame.

The bee hive is composed of a bottom $a$, sides $b\ b'$, ends $c\ c'$ and top $d$, and I prefer to employ carrying bars $d'$ upon the ends $c\ c'$. These parts are of wood and are similar to the hives heretofore made except that the ends $c\ c'$ are made lower than the sides $b\ b'$ for the reasons herein stated.

I employ openings 1, 2, in the end $c$ for the bees to enter and depart from the hive and an alighting board $a'$ pivotally connected to the end $c$ for the bees.

The movable frames are composed of the inclined end pieces $e$, the top bars $e'$, the lower bars $f$ and the metal pieces $f'$. These movable frames are rectangular, the end pieces $e$ being parallel to each other and the top bars $e'$ being parallel to the lower bars $f$, and the end pieces $e\ e$ are of uniform width and are not perpendicular, but slightly inclined, as shown in Fig. 2, and the bars $f$ are not equidistant from the edges of the end pieces but are nearly centrally below the top bars $e'$, which top bars $e'$ are slightly narrower than the end pieces $e\ e$, the object of this construction being that the combs as built vertically below the top bars $e'$ shall extend down to and rest upon the bottom bars $f$, as shown by dotted lines Fig. 2. The wedge pieces $g\ g'$ applied to the inner surfaces of the sides $b\ b'$ have their faces inclined to correspond to the inclination of the end pieces $e'$ of the frames, hence the frames and wedges set closely together in their proper positions, as seen in Fig. 2. The respective ends of the top bars $e'$ extend beyond the end pieces $e$ and over the ends $c\ c'$ of the hive and resting thereon suspend the movable frames and the combs carried thereby. The upper parts of the hive ends $c\ c'$ are beveled or concaved beneath the ends of the top bars $e'$, see Fig. 3. This enables the operator to place his fingers beneath the ends of the top bars in moving the frames, and in so doing the fingers are not near the places occupied by the bees.

Metal pieces $f'$ shown in perspective Fig. 4 assist in connecting the upper ends of the inclined end pieces $e$, and the respective ends of the top bars $e'$. These metal pieces $f$ have wedge shaped corners 3 and ribs 4. The corners 3 extend below the top bars $e'$ and outwardly from the outer surface of the end pieces $e$ and coming within the ends $c\ c'$ of the hive prevent looseness of the movable frames and cause said frames to be aligned with each other. The ribs 4 extend up to the under side of the cover and assist in supporting the cover and closing in the top of the hive. The cover $d$ is secured on the side $b$ and top edge of the follower board $h$ and is preferably provided with cleats to prevent it warping. The lower bars $f$ of the comb frame extend at their respective ends beyond the inclined end pieces $e$ and almost touch the ends $c\ c'$ of the hive and act with the corners 3 in insuring the proper position of the movable frames in the hive.

The follower board $h$ extends across within the hive between the ends $c\ c'$. Its edges at the bottom and ends are beveled so as to be V-shaped to lessen the risk of crushing the bees, and the top bar $h'$ extends over and is supported by the ends $c\ c'$, and wedge shaped strips $i\ i'$ are applied to the surfaces of the follower board contiguous to the end pieces $e$ of the comb frames, so that while the follower board $h$ stands vertical the wedge shaped pieces $i\ i'$ rest against the edges of the adjacent movable frame and correspond in inclination thereto. The back of the follower board $h$ is preferably notched, and I employ a wedge $k$ between the side $b'$ and follower board $h$ to press tightly together the said board and movable frames.

I have shown by dotted lines in Fig. 2 the combs within the movable frames. It will be noticed that the thickness of the combs corresponds to the width of the top bars $e'$ and the spaces between the combs correspond to the spaces between the top bars $e'$.

When frames are to be removed from or inserted into the hive, the top $d$ is taken off and the wedge $k$ is withdrawn and the follower board pushed back and the frames loosened, and in lifting out the frames the one next the follower board is usually first removed, and in replacing the frames, those most distant from the follower board are first inserted and brought to place.

It is to be understood that the combs are built vertical and they are commenced on the under sides of the top bars $e'$ and correspond in thickness to the width of such bars, hence the combs are in the positions indicated by dotted lines Fig. 2, and one edge of each inclined end piece $e$. at its lower end coincides or nearly so to the surfaces of the combs and the opposite edge of such inclined end piece projects beyond the surface of the comb, and the top ends of such end pieces occupy the reverse positions relatively to the comb.

In all cases the inclined positions of the end pieces $e\ e$ of the frames serve to keep the combs away from each other as the frames are inserted or withdrawn. Suppose the most distant frame from the follower $h$ is in place and the next frame is presented for insertion, the top parts of the end pieces $e$ of the frame that is in place are the most distant from the comb, and the bottom parts of the end pieces $e$ of the frame that is to be inserted are most distant from the comb, hence the combs cannot be rubbed against each other and there is no risk of injury to the combs or to the bees, and the combs come nearer together as the frame is inserted to place. This lessens the risk of injury, even when the frames are handled by inexperienced persons.

Wedges of different widths may be used in place of the wedge $k$, so as to provide for pressing a less number of frames together.

I claim as my invention—

1. The combination in a bee hive with the bottom $a$ and sides $b\ b'$, of the end pieces $c\ c'$ made lower than the sides, the movable frames having top bars $e'$ that extend over, rest upon, and are supported by the said end pieces, substantially as and for the purposes set forth.

2. The combination in a bee hive with the bottom $a$ and sides $b\ b'$, of the end pieces $c\ c'$ made lower than the sides and with beveled or concaved edges, the movable frames having top bars $e'$ that extend over, rest upon and are supported by the said end pieces, the beveled or concaved edges providing room for the fingers in lifting the frames, substantially as set forth.

3. The combination in a bee hive with the cover $d$, of the follower board $h$, the movable frames, and the metal pieces $f'$ upon the respective upper corners of the frames, said metal pieces $f'$ having ribs 4 upon their upper faces and upon which the cover in part rests, substantially as and for the purposes set forth.

4. The combination in a bee hive with the cover $d$, of the movable frames carrying the combs, the metal pieces $f'$ connected to the respective upper corners of the said frames and having wedge shaped corners 3 and ribs 4, substantially as and for the purposes set forth.

5. The combination with the cover and box in a bee-hive, of the wedge pieces $g\ g'$ within the box and near the corners of the same, movable frames for the combs setting against such wedge pieces and thereby caused to assume an inclined position, and a follower board and means for pressing the same against the movable frames to confine them in place, substantially as set forth.

6. The combination in a bee hive of the wedge pieces $g$ $g'$ secured to the side $b$ of the hive, movable frames having inclined end pieces $e$, the follower board $h$ and its ends $i$ $i'$ inclined to the face of said board and bearing against the inclined end pieces $e$, substantially as set forth.

7. In a bee hive, the movable frames composed of the parallel top bars $e'$ and lower bars $f$, the end pieces $e$ having parallel edges and standing at an inclination, and wedge shaped pieces within the hive, with faces at a corresponding inclination, substantially in the manner and for the purposes set forth.

Signed by me this 17th day of September, A. D. 1892.

L. AUGS. ASPINWALL.

Witnesses:
C. G. ROWLEY,
WALTER ALEXANDER.